United States Patent Office
3,501,510
Patented Mar. 17, 1970

3,501,510
ESTRIOL DERIVATIVES
Eugene E. Galantay, Morristown, N.J., assignor to Sandoz-Wander, Inc., a corporation of Delaware
No Drawing. Continuation-in-part of application Ser. No. 656,672, July 28, 1967. This application Nov. 13, 1967, Ser. No. 682,657
Int. Cl. C07c *169/08*
U.S. Cl. 260—397.5
29 Claims

ABSTRACT OF THE DISCLOSURE

The compounds are of the class of substituted-acylated estra-1,3,5(10)-trien-3,16a,17-triols. The compounds have estrogenic and progestational activity and hypocholesteremic activity.

---

This application is a continuation-in-part of my copending application Ser. No. 656,672, filed July 28, 1967 now abandoned.

This invention relates to compounds related to estriol and more particularly to compounds of the class of 17-hydrocarbon substituted acylated-1,3,5(10)-triene-3,16α,17-triols and to the preparation thereof, as well as intermediates in the preparation thereof.

The compounds are of the general structural Formula I

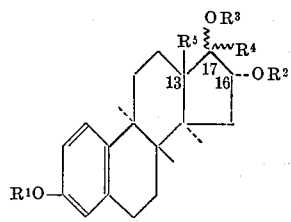

(I)

wherein each $R^1$, $R^2$ and $R^3$ is, independently, hydrogen or lower aliphatic acyl, i.e. of the formula

wherein:

A is lower alkyl, e.g., having from 1 to 5 carbon atoms;
$R^4$ is a lower acyclic hydrocarbon radical, e.g., having from 2 to 6 carbon atoms, and having up to two unsaturated position, any of which positions may be ethylenically or acetylenically unsaturated provided that the carbon atom of the radical which is adjacent to the 17-carbon atom is not a quaternary tetrahedral carbon atom and further provided that when acetylenic unsaturation is present that the radical has at least 3 carbon atoms and that said acetylenically unsaturated position is not adjacent to the 17-carbon atom, i.e. lower alkyl, lower alkenyl, lower alkadienyl, and propargyl lower alkyl-substituted propargyl, lower alkenynyl and lower alkadiynyl subject to the above-provisions; and
$R^5$ is lower alkyl having from 1 to 3 carbon atoms, i.e. methyl, ethyl, n-propyl or isopropyl; provided that at least one of $R^1$, $R^2$ and $R^3$ is lower aliphatic acyl.

Compounds I are obtained according to the following reaction scheme wherein:

$R^1$, $R^2$, $R^3$, $R^4$ and $R^5$ are as defined above; and
X is halo having an atomic weight of from 35 to 127, i.e. bromo, chloro and iodo;
each of $B^1$ and $B^2$ is independently acyl, e.g., lower aliphatic acyl having from 2 to 6 carbon atoms, preferably acetyl; and
Q is MgX5 $(Zn)_{1/2}$ or Li.

REACTION SCHEME

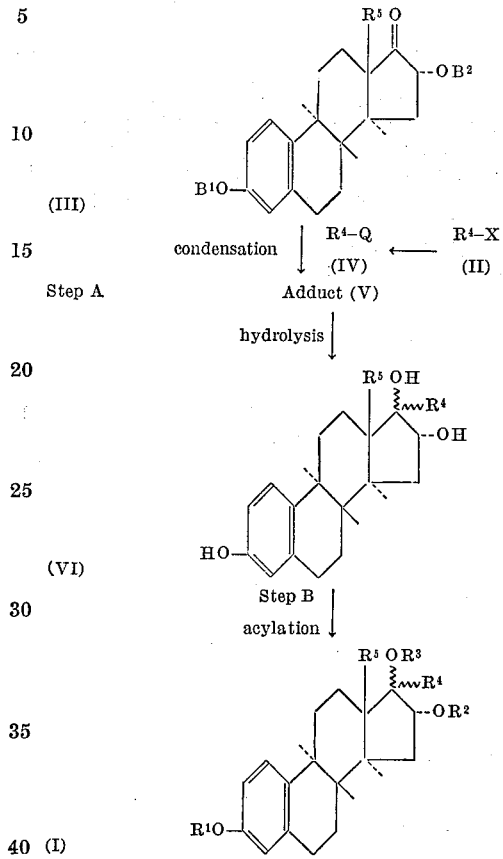

Exemplary of the preparation of a compound of Formula I, is (Step A) the condensation of (IV), a metalloorganic alkylating reagent, i.e. $R^4$—Q, with (III), a diacylated hydroxyestrone-type compound, i.e. a 3,16α-diacyloxyestra-1,3,5(10)-triene-17-one which may have the methyl at position-13 replaced by an ethyl, n-propyl or isopropyl function, to form an intermediate adduct (V) which is then hydrolyzed resulting in the formation of the corresponding estriol-type compound having a hydrocarbon radical at the 17-position (VI). Acylation (Step B) of the compound (VI) is effected with a suitable acylating agent, to form the corresponding compound (I).

In step A of the process there are two phases. The first phase is the condensation of (IV) with (III) to form the corresponding adduct (V). The second phase is the hydrolysis of the resulting adduct (V) to the corresponding estriol-type compound (VI).

Suitable compounds (IV) are known or may be prepared by methods known, per se. For example, when (IV), i.e. $R^4Q$, is a Grignard reagent, the preparation of the Grignard reagent (IV) may be effected in the conventional manner, e.g., and $R^4$ iodide, bromide or chloride (II) may be reacted with a suitable Grignard reagent-forming metal, e.g., magnesium, in an appropriate medium, e.g., diethyl ether or tetrahydrofuran, under anhydrous conditions.

The condensation of (IV) with (III) may be carried out in the conventional manner. The condensation is readily effected under anhydrous conditions, in an appropriate solvent, e.g., absolute diethyl ether, benzene, and tetrahydrofuran.

The hydrolysis of the resulting adduct (V) may be effected under conventional hydrolyzing conditions, e.g., under practically neutral conditions, preferably by intimate contact with saturated aqueous ammonium chloride. The condensation and hydrolysis steps are conveniently carried out sequentially without separation of the adduct (V).

As is illustrated by the above reaction scheme, in general, the $R^4$ moiety of the compound (I) corresponds to the $R^4$ moiety of the alkylating agent (IV). However, as is understood in the art, in instances where $R^4$ is allylic or propargylic in character, in proceeding from a compound (II) via a (IV) to a compound (VI) the phenomenon generally known as allylic and propargylic rearrangement, respectively, may occur. Thus, for example, the Grignard reagent obtained from commercial crotyl bromide (a mixture of $CH_3-CH=CH-CH_2Br$ and

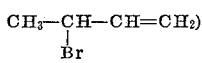

has the structure $CH_3-CH=CH-CH_2MgBr$; on reacting this with (III), the triols (VI) obtained have the (partial) structure

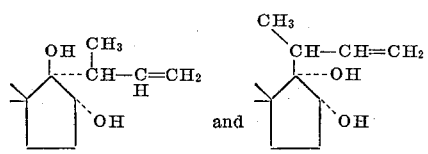

Similarly, propargylic Grignard reagents may yield products derived from a "propargylic rearrangement." E.g. the Grignard reagent derived from 1-bromo-2-butyne is a mixture of $CH_3-C\equiv C-CH_2MgBr$ and

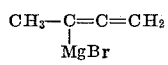

the products with (III) are triols of the (partial) structure

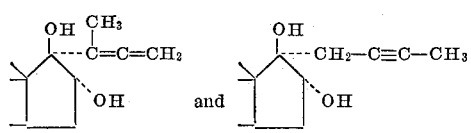

respectively. Finally, if $R^4$ contains any asymmetrical carbon atoms, a further isomerism is possible; out of the two possible diastereomers (per asymmetric carbon in $R^4$) one might be formed preferentially if not exclusively due to a phenomenon generally known as asymmetric induction.

On hydrolysis of the adduct (V), depending on the nature of the alkylating agent (IV) used in Step A, either, predominantly, one chemical species of triol (VI) is formed, or a mixture of structural and/or stereoisomeric triols (VI).

Thus, for example, Grignard reagents derived from "allylic" halides (e.g., allylmagnesium bromide, methallylmagnesium chloride) yield a mixture of two triols (VI) epimeric at Carbon Atom 17: i.e., a mixture of $17\alpha R^4$-$17\beta OH$ and $17\beta R^4$-$17\alpha OH$.

All the isomeric triols (VI) (or the 3,16 diacyl derivatives I) are within the scope of this invention. Separation, if desired, can be achieved by standard methods, e.g., fractional crystallization or chromatography.

Where the $R^4$ moiety of a compound (I) is unsaturated, then such an $R^4$ moiety can be reduced, by known means, e.g., catalytic hydrogenation. Thus, for example, a triple bond of an $R^4$ moiety can be reduced to a double bond using palladium on barium sulfate in pyridine and a double or triple bond may be reduced to a single bond using palladium on charcoal (carbon) in ethanol.

The hydrolysis of the adduct (V) yields the corresponding compound (VI) or a mixture of compound of Formula (VI), which may be separated if desired, by conventional means, and the recovered compounds individually acylated (Step B) to obtain the corresponding compound (I). However, when a mixture is obtained, it is convenient to acylate the mixture of products of Step A and then separate the acylated products, by conventional means, e.g., by chromatography.

The acylation step (Step B) may be effected under conventional acylating conditions using a suitable acylating agent i.e., one capable of introducing a

function into an organic compound, (A being as defined above), e.g., a lower alkanoic acid, or its acyl halide or acid anhydride or a mixture thereof. A preferred acylating agent is acetic anhydride, where the desired acyl moiety is acetyl. In carrying out the acylation, inert solvent may be employed or the acylating agent in excess may serve as solvent, preferably using an acid-binding agent, e.g., pyridine.

The compounds (III), i.e., the 3,16α-diacyloxy-1,3,5(10)-trien-estra-17-one-type compounds, employed in the above-described process are either known and can be prepared as described in the literature or they can be prepared from available materials in analogous manner to that described in the literature for the preparation of known compounds. For example, 3,16α-diacetoxy-estra-1,3,5(10)-trien-17-one is described in an article in the "Journal of the American Chemical Society" vol. 76, pages 2943 through 2948 (1954).

The compounds of Formula I are useful because they possess pharmacological activity in animals. In particular, such compounds have a combination of estrogenic/progestational activity and hypocholesteremic activity and are useful in the control of fertility in mammals and in menstrual dysfunction and ovarian deficiency syndrome, e.g., menopause in higher primates. The estrogenic/progestational activity may be demonstrated by the rabbit deciduoma test described in Elton et al. (Proc. Soc. Exper. Biol. and Med., 1966, 121:1194–1196). Said compounds are particularly useful as they are effective when given orally, as well as when given parenterally. For the above-mentioned uses the compounds are administered either orally or parenterally in daily dosages of from 1 milligram to 10 milligrams per diem, independent of the weight of the host. The daily dosage may be given in a single dose or in divided doses or from 2 to 4 times per diem. For the larger mammals as well as for smaller domestic mammals, dosage forms suitable for internal administration comprise from about 0.5 milligrams to about 5.0 milligrams of the compound admixed with a conventional solid or liquid pharmaceutical carrier or diluent. A representative formulation is a tablet (prepared by standard tabletting procedures) and containing the following ingredients:

| Ingredient: | Parts by weight |
| --- | --- |
| 17α - (buta - 1′,2′ - dien - 3′ - yl) - 3,16α - diacetoxyestra-1,3-5(10)-trien-3,16α,17β-triol | 0.5 |
| Tragacanth | 2 |
| Lactose | 89 |
| Corn starch | 5 |
| Talcum | 3 |
| Magnesium stearate | 0.5 |

The following examples are presented for the purpose of illustration. Temperatures are given in degrees centigrade, unless otherwise noted.

EXAMPLE 1

17α-allylestro-1,3,5(10)-triene-3,16α,17β-triol

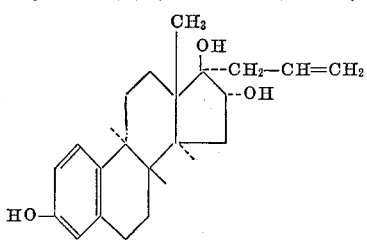

(a) To a Grignard mixture prepared in 128 ml. of ether, from 2.92 g. of magnesium turnings and 13.2 g. of allyl bromide, there is added, dropwise, under refluxing, a solution of 2.96 g. of 3,16α-diacetoxyestro-1,3,5(10)-trien-17-one in 30 ml. of tetrahydrofuran. After refluxing for a total of 18 hours, the mixture is cooled to 5° and dropwise treated with 30 ml. of aqueous saturated ammonium chloride solution, followed by 6.0 g. of anhydrous sodium sulfate. The supernatant solution is decanted and the inorganic solid layer is extracted with 5× 20 ml. of chloroform. The unified organic layers are evaporated in vacuo to yield a solid residue. Crystallization from 10 ml. of chloroform gives the title product, as colorless crystals, M.P. (168°)–170° to 173°

$[\alpha]^D_{(c.=1, \, EtOH)} = +18.69°$

The chloroform mother liquor contains additional title product and the isomer thereof, i.e. 17β-allylestra-1,3,5(10)triene-3,16α-17α-triol and is used to prepare acetylated end products (Example 2b).

(b) Allyllithium reagent in tetrahydrofuran is prepared as described in J. Org. Chem., 28, 2145 (1963). To 85 ml. of this reagent, containing 5.2 g. of allyllithium, there is added a solution of 3.00 g. of 3,16α-diacetoxyestra-1,3,5(10)-triene-17-one in 30 ml. of tetrahydrofuran. Processing is continued as described under Example 1a.

(c) Propargyl-zinc reagent in tetrahydrofuran is prepared, as described in Ann. Chim. (Paris) 13, 161 (1956), from 3.3 g. of zinc metal and 6.0 g. of propargyl bromide. Addition of 2.5 g. of 3,16α-diacetoxyestra-1,3,5(10)-trien-17-one (dissolved in 20 ml. of tetrahydrofuran) to this reagent and following the procedure described in Example 1a, leads to 17α-propargylestro-1,3,5(10)-triene-3,16α-17β-triol which dissolved in 5 ml. of pyridine, is stirred in a hydrogen atmosphere (760 mm.) in the presence of 50.0 mg. of Pd/BaSO₄; 5% catalyst until 1 molar equivalent of hydrogen is taken up. Filtration from the catalyst, precipitation of the addition of 20 ml. of water and filtration yields the title product which after recrystallization from 5 volumes of chloroform has a M.P. of 170° to 173°, $[\alpha]^D_{c.=1, \, EtOH} = +18.7°$.

EXAMPLE 2

17α-allyl-3,16α-diacetoxyestra-1,3,5(10)-trien-17β-ol

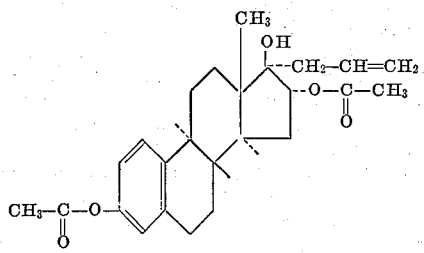

(a) 200 mg. of 17α-allylestra-1,3,5(10)-triene-3,16α,17β-triol is dissolved in a mixture of 1.67 ml. of dry pyridine and 0.74 ml. of acetic anhydride. After 18 hours at 5°, the mixture is poured on 10 ml. of ice water and the solid precipitate filtered. After drying, the substance is recrystallized from 1 ml. of methanol yielding the title product: M.P. 86° to 89°, $[\alpha]^D_{c.=1, \, CHCl_3} + 40.0°$.

(b) The chloroform mother liquor of the crystallization of the 17α-allylestra-1,3,5(10)-triene-3,16α,17β-triol (Example 1) is evaporated to dryness and the thus-obtained foamy material is first extracted with boiling petroleum ether (5× 10 ml.). The undissolved residue is dried and added to a mixture of 22 ml. of dry pyridine and 7.5 ml. of acetic anhydride. After 18 hours at 5°, the mixture is poured on 100 ml. of ice-water and the steroidal product extracted with benzene (5× 10 ml.).

The residue, obtained on evaporation of the benzene extract, is dissolved in 6 ml. of chloroform and applied to 8 preparative thin layer chromatography plates (200 x 400 mm.) covered with silica gel H adsorbent. After development with chloroform, two broad bands, clearly separated can be distinguished under UV light. The band with the smaller R_f value is eluted with ethyl acetate to yield the title product, M.P. 83° to 89°.

EXAMPLE 3

17β-allyl-3,16-diacetoxyestra-1,3,5(10)-trien-17α-ol

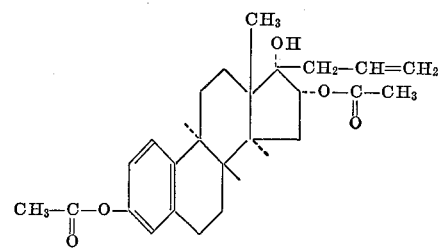

The band with the higher R_f value on the chromatogram described in Example 2b is eluted with ethyl acetate to yield the title product, M.P. 141° to 143.5°, $[\alpha]^D_{c.=1, \, CHCl_3} = 0°$

EXAMPLE 4

3,16α-diacetoxy-17α-methallylestra-1,3,5(10)-trien-17β-ol

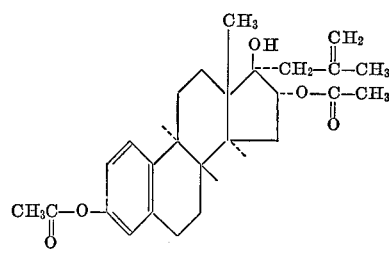

Following the procedure described in Example 1a, except using an equivalent amount of methallylmagnesium chloride as the alkylating agent, a mixture of the corresponding triols is obtained, i.e. 17α-methallylestra-1,3,5(10)-triene-3,16α,17β-triol and 17β - methallylestra - 1,3,5(10)-triene-3,16α,17α-triol, which is acylated following the procedures described in Examples 2b and 3, to obtain the title compound as an amorphous solid.

The isomer of the title compound is formed as co-product, as described in Example 5.

EXAMPLE 5

3,16α-diacetoxy-17β-methallylestra-1,3,5(10)-trien-17α-ol

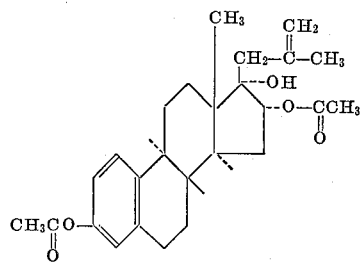

The title product is separately recovered from the reaction mixture obtained in Example 4 by thin layer chromatography; M.P. 125.5° to 128°, $[\alpha]^D_{c.=1,CHCl_3} = -17.4°$.

EXAMPLE 6

17α-(1'-methallyl)-estra-1,3,5(10)-triene-3,16α,17β-triol

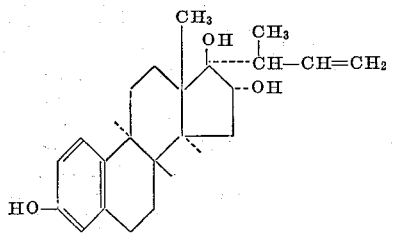

Reacting 3,16α-diacetoxyestra-1,3,5(10)-trien - 17 - one with the Grignard reagent prepared from crotyl bromide and otherwise proceeding as described in Example 1, the title product is isolated. $[\alpha]^D_{c.=1, EtOH}$: +56.94. An isomer of the title compound is also formed in this procedure; see Example 7.

EXAMPLE 7

17β-(1'-methallyl)estra-1,3,5(10)-trien-3-16α,17α-triol

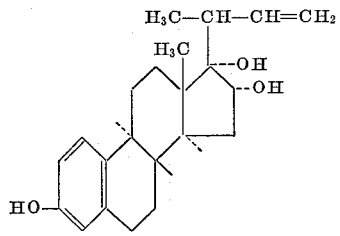

Title product is formed as a co-product in Example 6, and is recovered using preparative thin layer chromatography (200 x 400 mm. silica gel H, CHCl₃:CH₃OH=98:2 solvent system: $[\alpha]^D_{c.=1, EtOH}$ +37.37°.

EXAMPLE 8

3,16α-diacetoxy-17β-(1'-methallyl)estra-1,3,5(10)-trien-17α-ol

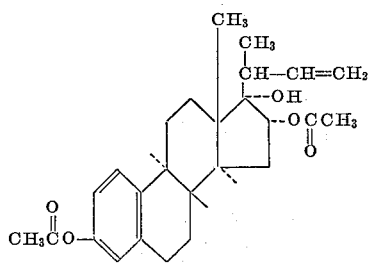

The title product is obtained from the title product of Example 7, by following the procedure of Example 2a; M.P. 140° to 143°, after recrystallization from methanol. $[\alpha]^D_{c.=1, CHCl_3}$: 0°.

EXAMPLE 9

3,16α-diacetoxy-17α-(1'-methallyl)estra-1,3,5(10)-trien-17β-ol

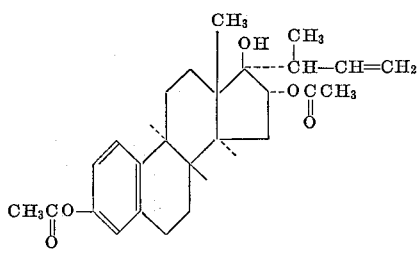

The title product is obtained from the title product of Example 6, by following the procedure of Example 2a; M.P. 118° to 121°.

EXAMPLE 10

17α-(2'-butyn-1'-yl)-3,16α-diacetoxyestra-1,3,5(10)-trien-17β-ol

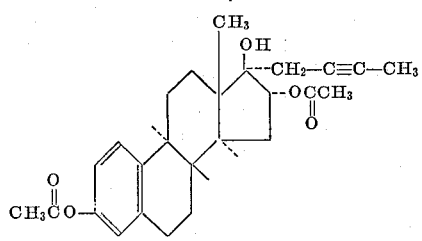

and

17α-(buta-1',2'-dien-3-yl)-3,16α-diacetoxyestra-1,3,5(10)-trien-17β-ol

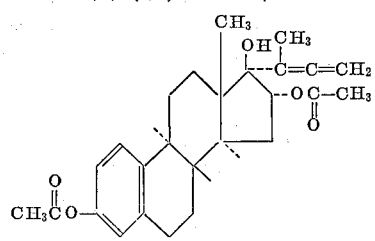

Step A.—Preparation of 7α-(2'-butyn-1'-yl)-estra-1,3,5(10)-triene-3,16α,17β-triol

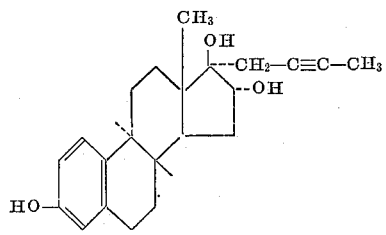

and

17α-buta-(1',2'-dien-3'-yl)-estra-1,3,5(10)-trien-3,16α,17β-triol

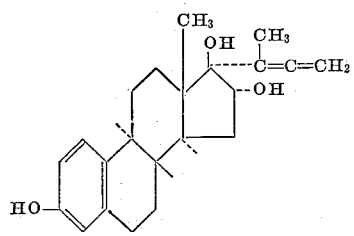

A Grignard reagent is prepared from 5.2 g. of activated magnesium, 32.2 g. of 1-bromo-2-butyne and 51 ml. of diethyl ether.

To the Grignard reagent is added, with stirring at 40° C. over a period of 10 minutes, a solution of 2.600 g. of 3,16α-diacetoxyestra-1,3,5(10)-trien-17-one in 8.5 ml. of tetrahydrofuran resulting in a semi-solid mixture, which is stirred for an additional 18 minutes. The semi-solid mixture is then cooled in an ice bath, 400 ml. of saturated aqueous amonium chloride added, the solids are separated by filtering and the filtrate and solids are each extracted 5 times with 50 ml. portions of diethyl ether.

The combined ethereal extracts are dried over anhydrous sodium sulfate and the solvent removed by evaporation under vacuum at 20° C. to obtain an oily residue. To the oily residue is added with stirring at room temperature (20° C.) 50 ml. of heptane resulting in the conversion of the oily residue to a solid. The solid is recovered by filtration, dried under vacuum and recrystallized from 100 ml. of chloroform to give a solid melting at 175 to 178° C. consisting of a mixture (in a weight ratio of about 3 to 2 parts) of 17α-(2'-butyn-1'-yl)-estra-1,3,5(10)-trien- 3,16α,17β-triol and 17α-(buta-1′,2′-dien-3′-yl)-estra-1,3,5(10)-trien-3,16α,17β-triol.

Step B.—Acetylation 0.817 g. of the solid mixture of 17α-(2′-butyn-1′-yl)-estra-1,3,5(10)-trien-3,16α,17β-triol and 17α-(buta-1′,2′-dien-3′-yl)-estra-1,3,5(10)-trien-3,16α,17β-triol, prepared according to Step A is added to a solution of 4.32 ml. of acetic anhydride in 13.0 ml. of pyridine and the resulting mixture stirred at room temperature (20° C.) for 17 hours, after which period the mixture is poured into 100 ml. of water and extracted 5 times with 10 ml. portions of methylene chloride. The combined methylene chloride extracts are dried over anhydrous sodium sulfate and the solvent removed by evaporation under vacuum to obtain a crystalline solid.

Step C.—Recovery 0.8856 g. of the crystalline solid obtained according to Step B is dissolved in 5 ml. of chloroform. The chloroform solution is applied to fine Silica Gel H[1] plates (38 cm. by 20 cm.; 0.1 cm. in thickness) and the chromatagram developed vertically in ascending fashion with chloroform as solvent.

The fastest moving band (between $R_f$ 0.45 and 0.55) is eluted with ethyl acetate to recover 17α-(buta-1′2′,-dien - 3′ - yl) - 3,16α - diacetoxyestra - 1,3,5(10) - trien-17β-ol, M.P. 155 to 158° C.

The second fastest band (between $R_f$ 0.22 and 0.40) is eluted with ethyl acetate to recover 17α-(2′-butyn-1′-yl)-3,16α-diacetoxyestra-1,3,5(10)-trien-17β-ol, M.P. 167 to 170° C.

EXAMPLE 11

17α-(2′-butyn-1′-yl)-3,16α-diisobutyryloxyestra-1,3,5(10)-trien-17β-ol

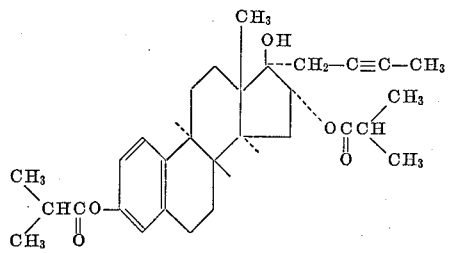

284 mg. of 17α-(2′-butyn-1′-yl)estra-1,3,5(10)-triene-3,16α,17β-triol (obtained as described in Example 10) is added at −10° to a mixture of isobutyroyl chloride (3 ml.) and pyridine (7 ml.). After 1 hour, the mixture is poured on ice water, the title product is extracted with benzene and purified by thin layer chromatography.

EXAMPLE 12

3,16α-diacetoxy-17α-vinylestra-1,3,5(10)-trien-17β-ol

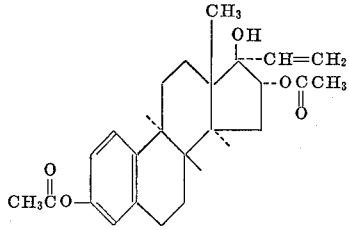

(a) By proceeding as described in Example 1a but using vinylmagnesium bromide in lieu of allylmagnesium bromide, 17α-vinylestra-1,3,5(10)-triene-3,16α,17β-triol is obtained, which is then acylated following the procedure described in Example 2b to obtain the tile product; M.P. 143° to 145° $[\alpha]^D_{CHCl_3, c'=1}+96.1°$.

---

[1] "Silica Gel H" according to Stahl manufactured by Merck A.G., Darmstadt, Germany.

The title products similarly prepared using as the alkylating reagent vinyllithium [J. Org. Chem. 26, 2096 (1961)].

(b) The title product is alternatively obtained by stirring a solution of 300 mg. of 17α-ethynylestra-1,3,5(10)-trien-3,16α,17β-triol (obtainable as described in U.S. Patent 3,336,347) in 10 ml. of absolute pyridine in the presence of 50 mg. of Pd/BaSO₄ 5% catalyst in a hydrogen atmosphere of 1 atm., until 1 molar equivalent of hydrogen is consumed; filtration from the catalyst; addition of 0.3 ml. of acetic anhydride to the pyridine filtrate and storage for 4 hours at room temperature (20° C.) finally isolating the product by adding water to the mixture, filtration and recrystallization (from methanol) of the precipitated solid.

EXAMPLE 13

17α-allyl-3,16α,17β-triacetoxyestra-1,3,5(10)-triene

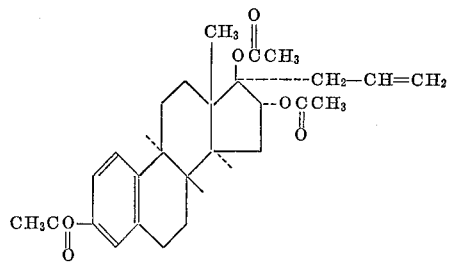

A mixture of 1.0 g. of 17α-allylestra-1,3,5(10)-triene-3,16α,17β-triol, 30 ml. of isopropenyl acetate and 0.15 g. of p-toluenesulfonic acid monohydrate is slowly distilled at atmospheric pressure for 7 hours. After cooling, ether (100 ml.) is added and the solution is washed with (3× 20 ml.) ice-cold 10% NaHCO₃ solution, followed by 3× 20 ml. of water, finally dried and evaporated to give the title product as a foam.

EXAMPLE 14

3,16α-diacetoxy-17α-ethylestra-1,3,5(10)-trien-17β-ol

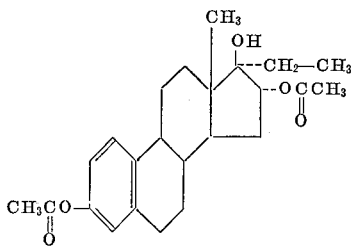

A mixture of 400 mg. of the crude 17α-vinylestra-1,3,5(10)-trien-3,16α,17β-triol (obtained as an intermediate in the preparation of the compound described in Example 12), 30 mg. of palladium-carbon (5%) catalyst and 5 ml. of ethanol is stirred, at 25°, in a hydrogen atmosphere (760 mm.) until the calculated volume of hydrogen is taken up. After filtration, the solution is evaporated to dryness and the residue is dissolved in 4.8 ml. of pyridine; 0.8 ml. of acetic anhydride is added and the mixture is kept at 40° for 5 hours. It is then poured in 25 ml. of water, the white precipitate filtered, washed with water and dried. On recrystallization from aqueous methanol the title product is obtained as white crystals, M.P. 135.0° to 136°.

EXAMPLE 15

3,16α-diacetoxy-17α-(1'-methylpropargyl)estra-1,3,5(10)-trien-17β-ol

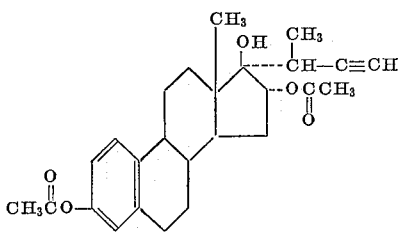

Following Example 1a (but using the Grignard reagent from 3-bromo-1-butyne) a mixture of 17β-(1'-methylpropargyl)-estra-1,3,5(10)-triene-3,16α,17α-triol and 17α-(1' - methylpropargyl) - estra - 1,3,5(10) - triene - 3,16α,17β-triol is obtained which is acylated as described in Example 2a, to obtain the title product; M.P. 158° to 161°.

The reaction mixture also contains an isomer of the title product; see Example 16.

EXAMPLE 16

3,16α-diacetoxy-17β-(1'-methylpropargyl)estra-1,3,5(10)trien-17α-ol

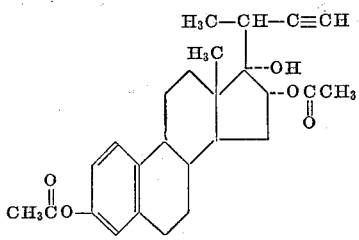

The title product is formed along with that of Example 15 and is separated therefrom by thin layer chromatography (silica gel H, chloroform), M.P. 128° to 132°.

What is claimed is:

1. A compound of the formula

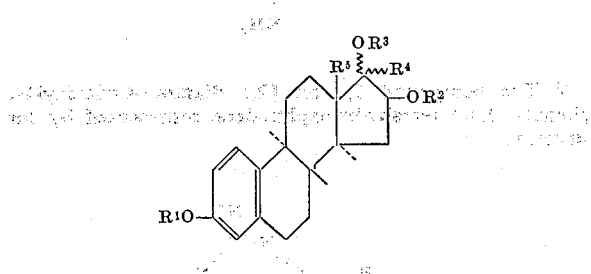

wherein:

each of $R^1$, $R^2$ and $R^3$ is, independently, hydrogen or lower aliphatic acyl, provided that at least one of $R^1$, $R^2$ and $R^3$ is lower aliphatic acyl;

$R^4$ is lower acyclic hydrocarbon radical having from one to two unsaturated positions, any of which positions may be ethylenically or acetylenically unsaturated, provided that the carbon atom of the radical which is adjacent to the 17-carbon atom is not a quaternary tetrahedral carbon atom, and further provided that when acetylenic unsaturation is present that the radical has at least 3 carbon atoms and that said acetylenically unsaturated position is not adjacent to the 17-carbon atom; and $R^5$ is alkyl having from 1 to 3 carbon atoms.

2. A compound of the formula

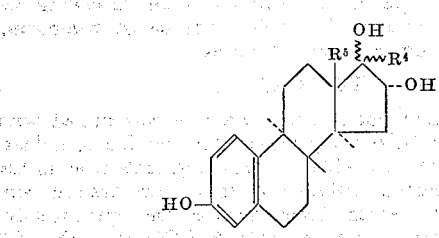

wherein:

$R^4$ is lower acyclic hydrocarbon radical having from one to two unsaturated positions, any of which positions may be ethylenically or acetylenically unsaturated, provided that the carbon atom of the radical which is adjacent to the 17-carbon atom is not a quaternary tetrahedral carbon atom, and further provided that when acetylenic unsaturation is present that the radical has at least 3 carbon atoms and that said acetylenically unsaturated position is not adjacent to the 17-carbon atom; and $R^5$ is alkyl having from 1 to 3 carbon atoms.

3. The compound of claim 2 which is 17α-allylestra-1,3,5(10)-triene-3,16α,17β-triol.

4. The compound of claim 2 which is 17β-allylestra-1,3,5(10)-triene-3,16α,17α-triol.

5. The compound of claim 2 which is 17α-methallylestra-1,3,5(10)-triene-3,16α,17β-triol.

6. The compound of claim 2 which is 17β-methallylestra-1,3,5(10)-triene-3,16α,17α-triol.

7. The compound of claim 2 which is 17α-(1'-methallyl)-estra-1,3,5(10)-triene-3,16α,17β-triol.

8. The compound of claim 2 which is 17β-(1'-methallyl)-estra-1,3,5(10)-triene-3,16α,17α-triol.

9. The compound of claim 2 which is 17α-(2'-butyn-1'-yl)-estra-1,3,5(10)-triene-3,16α,17β-triol.

10. A compound of claim 2 wherein $R^4$ is lower alkadienyl.

11. The compound of claim 2 which is 17α-vinylestra-1,3,5(10)-triene-3,16α,17β-triol.

12. The compound of claim 2 which is 17α-(1'-methylpropargyl)-estra-1,3,5(10)-trien-3,16α,17β-triol.

13. The compound of claim 2 which is 17β-(1'-methylpropargyl)-estra-1,3,5(10)-trien-3,16α,17α-triol.

14. The compound of claim 2 which is 17α-propargyl-estra-1,3,5(10)-triene-3,16α-17β-triol.

15. The compound of claim 1 which is 17α-(beta-1',2'-dien-3'-yl)-estra-1,3,5(10)-triene-3,16α,17β-triol.

16. The compound of claim 1 which is 17α-allyl-3,16α-diacetoxyestra-1,3,5(10)-trien-17β-ol.

17. The compound of claim 1 which is 17α-allyl-3,16α,17β-triacetoxyestra-1,3,5(10)-triene.

18. The compound of claim 1 which is 17β-allyl-3,16α-diacetoxyestra-1,3,5(10)-trien-17α-ol.

19. The compound of claim 1 which is 3,16α-diacetoxy-17α-methallylestra-1,3,5(10)-trien-17β-ol.

20. The compound of claim 1 which is 3,16α-diacetoxy-17β-methallylestra-1,3,5(10)-trien-17α-ol.

21. The compound of claim 1 which is 3,16α-diacetoxy-17β-(1'-methallyl)-estra-1,3,5(10)-trien-17α-ol.

22. The compound of claim 1 which is 3,16α-diacetoxy-17α-(1-methallyl)-estra-1,3,5(10)-trien-17β-ol.

23. A compound of claim 1 wherein $R^4$ is lower alkadienyl.

24. The compound of claim 1 which is 17α-(2'-butyn-1'-yl)-3,16α-diacetoxyestra-1,3,5(10)-trien-17β-ol.

25. The compound of claim 1 which is 17α-(2′-butyn-1′-yl)-3,16α-diisobutyryloxyestra-1,3,5(10)-trien-17β-ol.

26. The compound of claim 1 which is 3,16α-diacetoxy-17α-vinylestra-1,3,5(10)-trien-17β-ol.

27. The compound of claim 23 which is 17α-(buta-1′,2′-dien-3′-yl)-3,16α-diacetoxyestra-1,3,5(10)-trien-17β-ol.

28. The compound of claim 1 which is 3,16α-diacetoxy-17α-(1′-methylpropargyl)-estra-1,3,5(10)-trien-17β-ol.

29. The compound of claim 1 which is 3,16α-diacetoxy-17β-(1′-methylpropargyl)-estra-1,3,5(10)-trien-17α-ol.

References Cited

UNITED STATES PATENTS

| | | | |
|---|---|---|---|
| 3,107,257 | 10/1963 | Counsell | 260—397.5 |
| 3,210,390 | 10/1965 | Meloy | 260—397.5 |
| 3,336,347 | 8/1967 | Engelfried et al. | 260—397.5 |
| 3,392,165 | 7/1968 | Edwards et al. | 260—239.55 |

OTHER REFERENCES

Goldkamp et al., Journ. Medicinal Chem., 8, No. 4, p. 409 (1965).

Ghera E., Tetrahedron Letters, No. 1, pp. 17–21 (January 1967).

ELBERT L. ROBERTS, Primary Examiner

ETHEL G. LOVE, Assistant Examiner

U.S. Cl. X.R.

424—238